Dec. 8, 1936.　　　G. FREDRICKSON　　　2,063,800
HEATING AND DEMAGNETIZING APPARATUS
Filed July 21, 1932　　　4 Sheets-Sheet 1

INVENTOR:-
GUSTAV FREDRICKSON,
BY
Gales P. Moore
HIS ATTORNEY.

Dec. 8, 1936.　　　G. FREDRICKSON　　　2,063,800
HEATING AND DEMAGNETIZING APPARATUS
Filed July 21, 1932　　　4 Sheets-Sheet 2

INVENTOR:—
GUSTAV FREDRICKSON,
BY
Gales P. Moore
HIS ATTORNEY

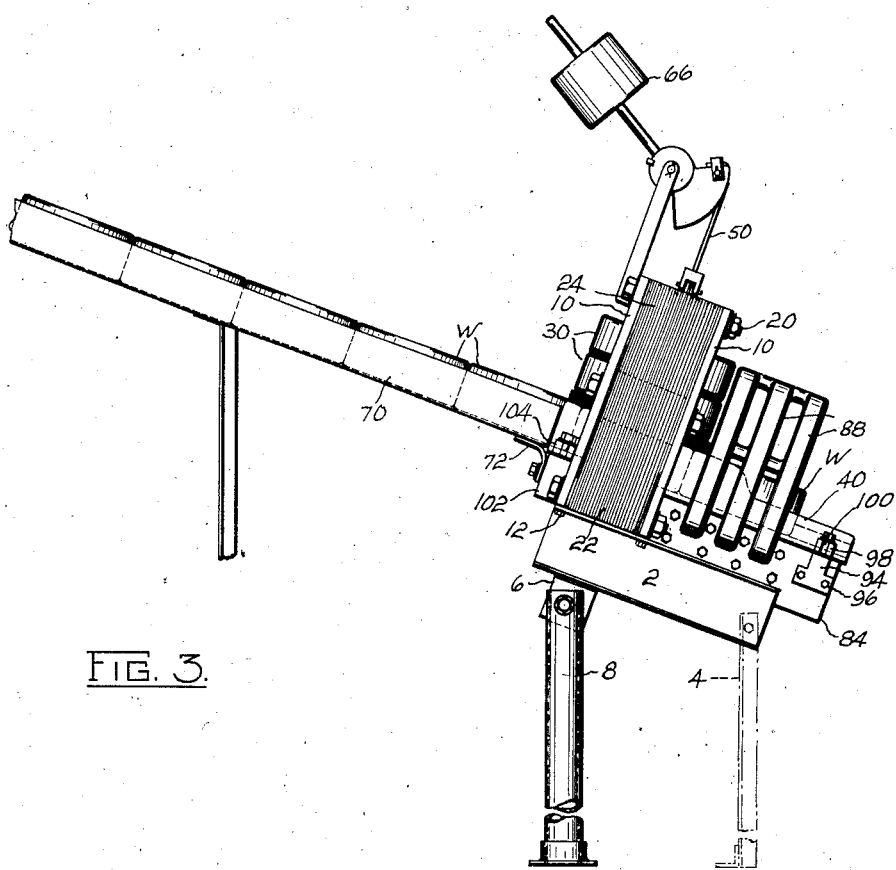

Patented Dec. 8, 1936

2,063,800

UNITED STATES PATENT OFFICE 2,063,800

HEATING AND DEMAGNETIZING APPARATUS

Gustav Fredrickson, Forestville, Conn., assignor, by mesne assignments, to General Motors Corporation, Detroit, Mich., a corporation of Delaware Application July 21, 1932, Serial No. 623,785

6 Claims. (Cl. 219—11)

This invention relates to heating and demagnetizing apparatus and comprises all of the features of novelty herein disclosed. An object of the invention is to provide an improved heating and demagnetizing apparatus, especially for a series of hollow articles such as race rings for bearings, in order to expand them to facilitate assembly and rid them of foreign particles to facilitate cleaning. Another object is to provide an efficient electric heater for heating a series of articles to a desired temperature, each in a prescribed period of time, the period preferably being that normally required for performing some operation on an article after it is heated.

To these ends and also to improve generally upon devices of this character, the invention consists in the various matters hereinafter described and claimed. In its broader aspects, the invention is not necessarily limited to the specific construction selected for illustrative purposes in the accompanying drawings in which—

Fig. 3 is a side elevation of the apparatus to smaller scale than Fig. 1.

Fig. 4 is a cross sectional view.

Figure 1:
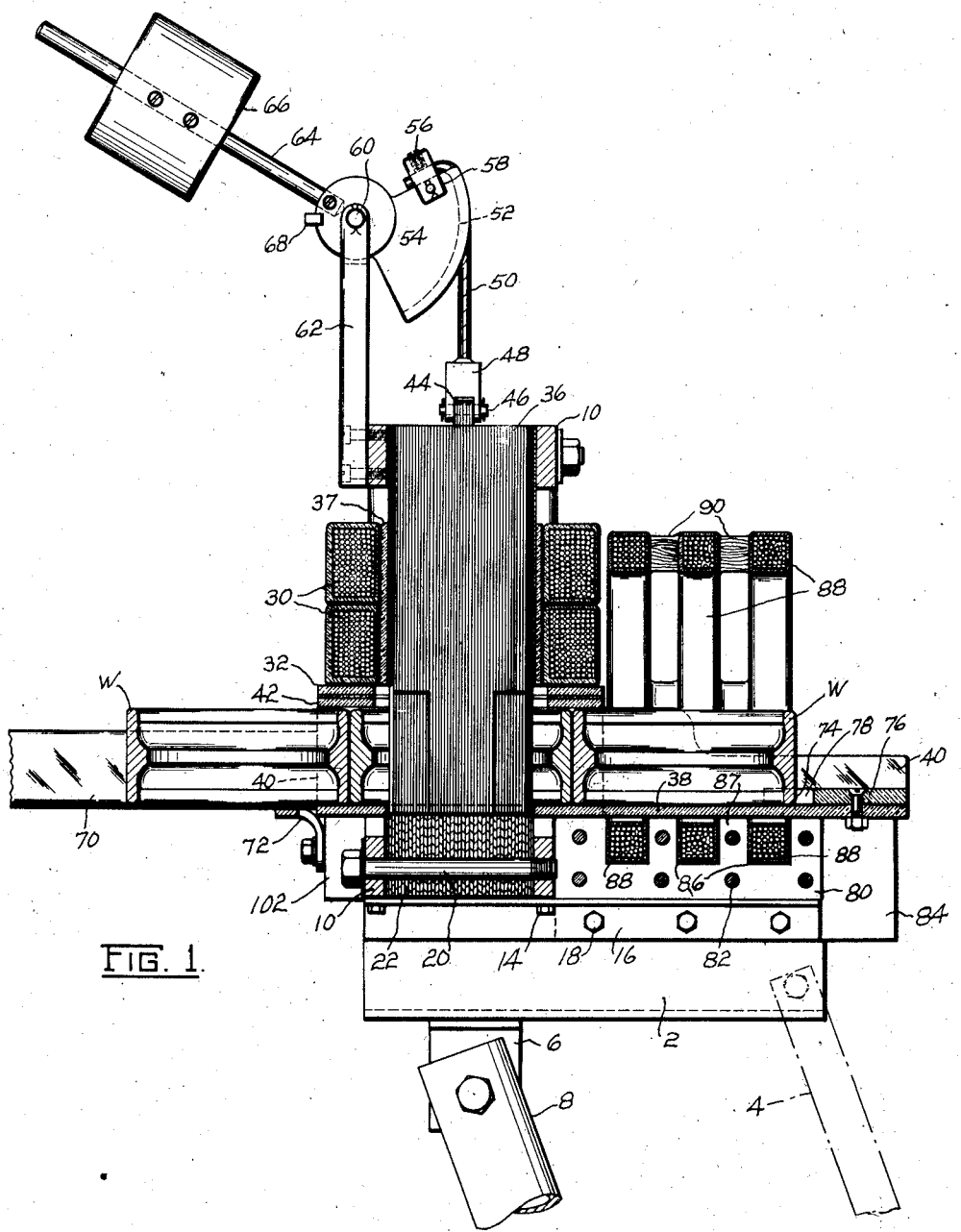
Fig. 1 is a side view of the apparatus with portions in longitudinal section.
Figure 2:
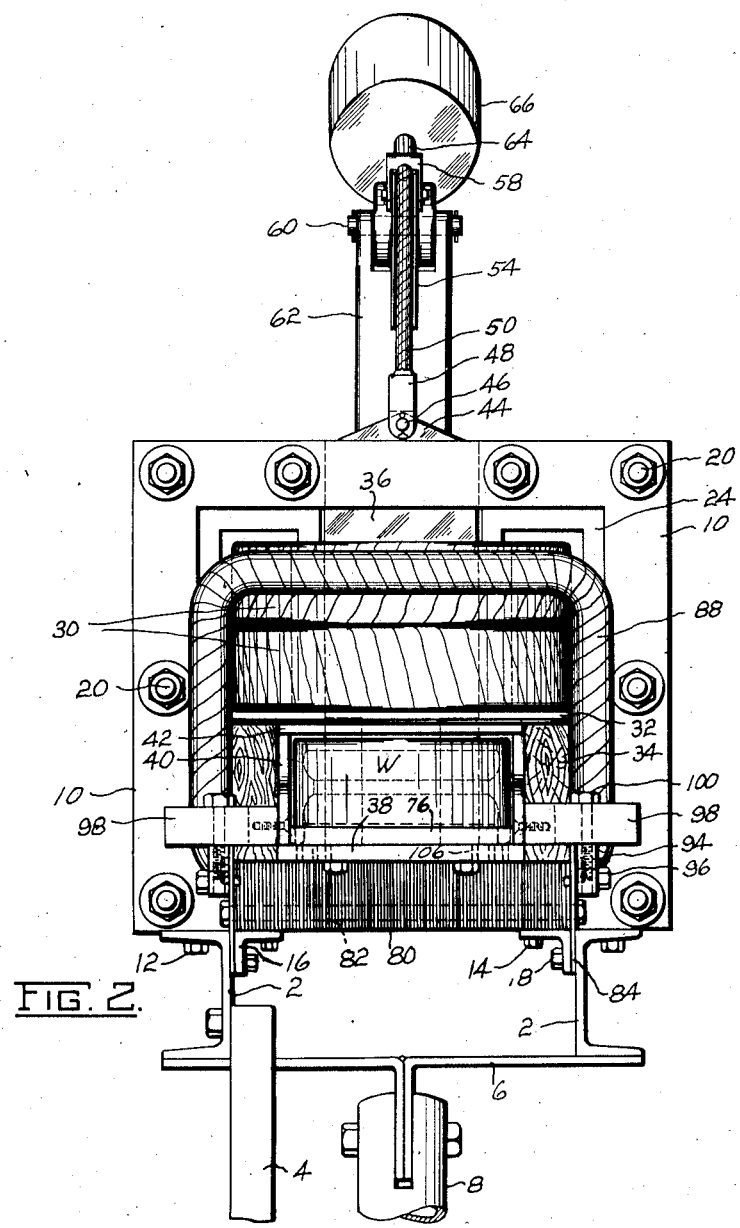
Fig. 2 is a front elevation.

A pair of parallel channel irons 2 are arranged in an inclined position and supported at the front by a pair of standards 4. Angle brackets 6 connect the channel irons at the rear and have their adjacent ends secured in the slotted upper end of a post 8. A pair of yokes or rectangular frames 10 are secured by screw bolts 12 to the upper legs of the channel irons 2. They are also secured by screw bolts 14 to the upper legs of angle irons 16 which are fastened to the channel irons by screw bolts 18. Clamped between the frames 10 by cross bolts 20 are laminations in upper and lower sections, the lower laminations 22 being U-shaped and the upper sections 24 being divided into right and left angular sections which break joints as indicated at 26 with the lower sections. The upper sections 24 have their adjacent ends provided with core pieces or legs 28 which project downwardly and enter insulated heating coils 30 which are supported on layers of insulating material 32 carried on the top of blocks 34 which may conveniently be made of wood.

A laminated core or plunger 36 is mounted to slide vertically between the legs 28 and between the frames 10, a sheet of insulation 37 extending between the coils and the plunger and between the coils and the legs 28. The plunger is approximately square in cross section but the corners are slabbed off at the lower end so that the plunger will more nearly fit a round opening in a workpiece W, herein shown as a bearing outer race ring to be heated, as for the purpose of expanding it to facilitate assembly of bearing balls between the race ring and a cooperating inner race ring (not shown). The end of the plunger abuts against the lower laminations 22, passing through a hole in a work guide or chute bottom 38 which supports the work. The chute has side walls 40 extended to the front of the machine where their height is diminished and there is a top plate 42 resting on the side walls and between the blocks 34. All parts of the chute are preferably of insulating material. Some of the laminations of the plunger are extended upwardly to form lugs 44 pivoted by a pin 46 to a block 48 having a cable 50 attached to it. The cable fits in a groove 52 in an arcuate lever arm 54, the upper end of the cable being secured by a set screw 56 to a bracket 58 on the arm. The arm has a hub pivoted at 60 to a standard 62 and having radial openings into one of which is secured a bar 64. A weight 66 is adjustably secured to the bar and acts to elevate the plunger from the work when the plunger is released from magnetic influences, a stop 68 on the hub then engaging the standard 62 to limit swinging.

The work to be heated slides by gravity in a stream down an inclined feed chute 70 which is supported flush with the chute bottom 38 by a bracket 72. The foremost piece engages a concave edge stop 74 on a stop plate 76 which is adjustably secured on the bottom of the chute in a position to locate one piece at a time directly below the plunger when the latter is raised. A central notch 78 cut forwardly from the concave edge 74 facilitates picking up the heated piece from the machine. Laminations 80 extend lengthwise along the article path below the chute bottom 38, being clamped by bolts 82 to side plates 84 which are clamped between the channel irons 2 and the angle irons 16. The laminations have cross recesses 86 between projections 87 to receive or straddle the base portions of rectangular demagnetizing coils 88 which surround the chute and the workpiece, the coils being separated at top and sides by spacing blocks 90. T-shaped brackets 94 are fastened by screw bolts 96 to the side plates 84 and support blocks 98 which are fastened to the sides 40 of the chute. The blocks are slotted in from the end to adjustably receive clamping bolts 100 projecting upwardly from the brackets 94 and by means of which the chute can be narrowed for smaller work, first removing the stop plate 76 and replacing it with a narrower one. Brackets 102 are fastened to the rear frame 10 and have clamping bolts in slotted blocks 104 similar to the blocks 98.

Figure 5:
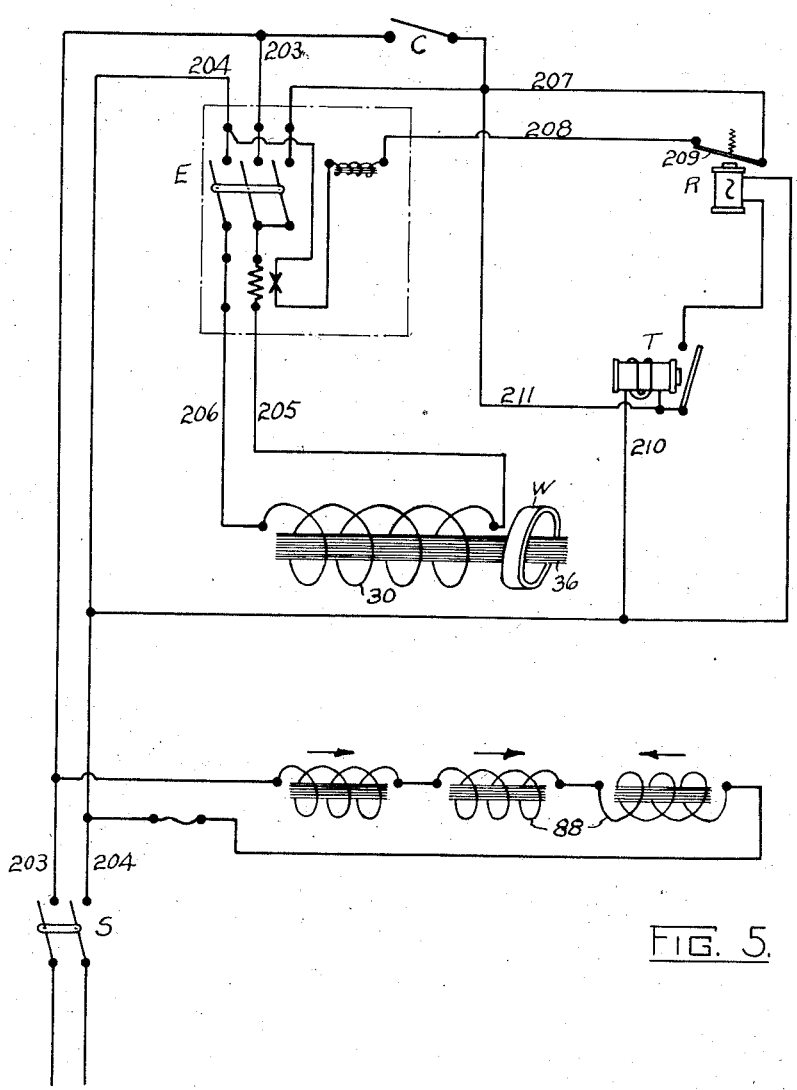
Fig. 5 is a diagram.

Electrical connections are made to the machine according to Fig. 5 wherein alternating current is supplied to lines 203 and 204 through a two-pole single throw switch S. The main heating coil 30 is controlled by an electromagnetic switch E which connects lines 203 and 204 to lines 205 and 206, the latter being connected to opposite terminals of the continuous coil 30 which is enclosed in the laminations 22 and 24 but itself encloses the core extensions 28 and the plunger 36. The core extensions 28 act to by-pass some of the magnetic field while the plunger is descending to close the gap between the latter and the laminations 22. Thus the magnetic pull on the plunger is diminished to lessen the force with which it meets the laminations. When the plunger seats itself, the total magnetic field is through the plunger, generating an alternating electrical current through the work piece W which acts as a secondary and becomes heated. The electromagnetic switch E is closed by a momentary contact switch C which completes a circuit through wires 207 and 208 and a relay switch 209. The electromagnetic switch E remains closed until relay switch 209 is opened by a relay R under control of a time limit switch T whose coil is connected by wires 210 and 211 to the lines 203 and 204 when the switches C and E are closed. When the predetermined time has elapsed and switch T closes, the relay R is energized, being then connected to the lines 203 and 204 by the time limit switch T. The relay R then opens the holding circuit through the relay switch 209 and the electromagnetic switch E thereupon opens. The plunger 36 is thus freed from magnetic pull and is lifted out of the work by the weight. The removal of a previously heated piece lets the newly heated piece slide down the chute through the demagnetizer to the stop. If desired, the starting switch C may be closed by making a heated piece engage it when such piece is placed in its assembling fixture.

The demagnetizing coils 88 which are also heating coils to a comparatively small degree are directly connected to the lines 203 and 204 and are kept energized when the machine is in use. The demagnetizer has three coils in series the last one having the coils wound in a reverse direction from the other two. This construction, together with the laminations 80, provides alternating magnetic flux through the work, the direction changing from horizontal to vertical and gradually decreasing in intensity as the work reaches its stopped position. The change in direction occurs substantially between the last two coils which oppose one another and where core projections 87 serve as a vertical path for the flux. The work is thus demagnetized after it has been heated by the heating coils 30. The magnetic field within the demagnetizer is made strong enough to maintain the temperature of the work by eddy currents and hysteresis heating. The work is heated by the heating coils 30 to say 250° F. in fifteen seconds and the demagnetizer will provide enough heat to compensate for radiation and keep the temperature up until the piece is removed for assembly.

By the present apparatus, the work-pieces are reliably heated one at a time to a uniform temperature and the period is so short that the work loses none of its hardness. The period of heating can be synchronized with the next operation such as assembling. To hold the work against the chute bottom 38 and below the plunger 36 while the plunger is descending, thus to prevent chattering of the work during heating, a magnetic chuck effect is obtained by arcuate series of short steel slugs 106 set into the chute bottom in positions to magnetically connect the lower edge of the work-piece with the subjacent laminations 22.

I claim:

1. In apparatus of the character described, an article support having an opening, a laminated structure looped around the support, the base of the laminations engaging the work support and extending across the opening, a laminated plunger slidable through the opening into contact with the base of the laminations, and a coil above the work support and surrounding the plunger; substantially as described.

2. In apparatus of the character described, a chute for guiding an article to be heated, laminations surrounding the chute and having core projections extending towards the chute, a heating coil within the laminations and surrounding the core projections, and a laminated plunger slidable through the coil and into an opening in the article; substantially as described.

3. In apparatus of the character described, an article support having an opening, a laminated structure looped around the support, the base of the laminations extending across the opening, a laminated plunger slidable through the opening into contact with the base of the laminations, core projections surrounding the plunger and projecting towards the base of the laminations, and a coil surrounding the core projections; substantially as described.

4. In apparatus of the character described, laminations surrounding a work receiving space and having core projections extending towards said space, a heating coil within the laminations and surrounding the core projections, and a laminated plunger slidable between the core projections; substantially as described.

5. In apparatus of the character described, an article support, laminations surrounding the support, a plunger slidable through the laminations, the article support having an opening for the plunger, means extending through the article support for magnetically connecting the laminations with the space above the support, a heating coil surrounding the plunger for advancing it magnetically, and means for retracting the plunger; substantially as described.

6. In apparatus of the character described, a laminated structure looped around a work receiving space and having an opening, a laminated plunger slidable in the opening and adapted to pass through a hollow work-piece to engage the base of the laminated structure, and means surrounding the plunger for controlling its advance with a diminishing force; substantially as described.

GUSTAV FREDRICKSON.